(12) United States Patent
Ha et al.

(10) Patent No.: US 6,480,462 B2
(45) Date of Patent: *Nov. 12, 2002

(54) HYBRID OPTICAL DISC CONSTRUCTION

(75) Inventors: Bruce Ha, Webster, NY (US); James A. Barnard, Scottsville, NY (US); Thomas C. Burgo, Brockport, NY (US)

(73) Assignee: Eastman Kodak Company, Rochester, NY (US)

( * ) Notice: Subject to any disclaimer, the term of this patent is extended or adjusted under 35 U.S.C. 154(b) by 45 days.

This patent is subject to a terminal disclaimer.

(21) Appl. No.: 09/739,953

(22) Filed: Dec. 18, 2000

(65) Prior Publication Data

US 2001/0005357 A1 Jun. 28, 2001

Related U.S. Application Data

(63) Continuation-in-part of application No. 09/323,496, filed on Jun. 1, 1999.

(51) Int. Cl.$^7$ .................................................. G11B 7/24
(52) U.S. Cl. ................. 369/275.4; 428/64.4; 369/275.2
(58) Field of Search .......................... 369/275.4, 275.2, 369/44.26, 44.27; 428/64.1, 64.4; 430/320, 321

(56) References Cited

U.S. PATENT DOCUMENTS

| | | | | |
|---|---|---|---|---|
| 5,138,598 A | * | 8/1992 | Sako et al. | 369/47 |
| 5,204,852 A | * | 4/1993 | Nakagawa et al. | 369/275.1 |
| 5,316,814 A | * | 5/1994 | Sawada et al. | 428/64.8 |
| 5,430,706 A | * | 7/1995 | Utsunomiya et al. | 369/275.1 |
| 5,696,758 A | * | 12/1997 | Yanagimachi et al. | 369/275.4 |
| 5,926,446 A | * | 7/1999 | Shimizu | 369/275.4 |
| 6,031,808 A | * | 2/2000 | Ueno | 369/111 |
| 6,144,625 A | * | 11/2000 | Kuroda et al. | 369/44.27 |

* cited by examiner

Primary Examiner—Tan Dinh
(74) Attorney, Agent, or Firm—Raymond L. Owens

(57) ABSTRACT

A hybrid optical recording disc having a substrate and a recording layer disposed over the substrate, the substrate having a read-only (ROM) area in which a groove is modulated by depressions in the substrate and a recordable area in which the groove from the read-only area extends into the substrate in the recordable area. The groove in the read-only area forming wobbling tracks having a depth greater than 170 nm and wherein the depth d2 of the depression in the groove in the read-only area is in a range greater than 170 nm and less than 350 nm.

3 Claims, 3 Drawing Sheets

HYBRID OPTICAL DISC CONSTRUCTION

FIELD OF THE INVENTION

This is a continuation-in-part of U.S. application Ser. No. 09/323,496 filed Jun. 1, 1999 entitled "Hybrid Optical Disc Construction" by Bruce Ha, et al.

The present invention relates to optical recording discs and more particularly to a hybrid disc having a read-only area (ROM) in which a depth modulated groove is formed and a write once recordable or rewritable area.

BACKGROUND OF THE INVENTION

Optical recording discs of the write-once or rewritable type include a substrate having a recording layer. The substrate is formed by injection molding to include a wobbled groove on the surface of the substrate where the recording layer is formed. The groove defines recording channels on the disc for recording data and also provides for tracking of the disc while writing or reading data. The groove, which generates a frequency modulated signal after detection and processing, also contains addressing and other information that are necessary for the write and read processes. The groove is usually in accordance with Orange Book specifications. "Orange Book" is a specification published by Philips Corporation and Sony Corporation which defines key properties of recordable compact disc (CD-R) media and recording procedures.

The recording layer, which can include an organic dye, is deposited on the substrate so as to completely cover the groove. The recording layer can be deposited by various techniques, including spin-coating, gravure, roller, flexographic, and vapor phase deposition. A reflective layer is then formed over the entire recording layer using similar techniques. The reflective layer can be, for example, gold, silver, or copper.

Hybrid optical discs are those discs which have a read-only area in which a depth modulated groove is formed and a recordable area. Typically a wobble groove is provided in both areas. As set forth in U.S. Pat. No. 5,696,758 specifies geometry of the wobbled depth modulated groove. The reason for this is that hybrid discs typically have to meet the Orange Book specifications, and it is difficult to achieve these standards with a wobbled depth modulated groove. Particular depths are specified to be in accordance with the Orange Book specifications.

SUMMARY OF THE INVENTION

It is an object of this invention to provide a hybrid optical disc which provides improved readability by increasing the tracking signal produced from the wobble groove.

This object is achieved in a hybrid optical recording disc having a substrate and a recording layer disposed over the substrate, the substrate having a read-only (ROM) area in which a groove is modulated by depressions in the substrate and a recordable area in which the groove from the read-only area extends into the substrate in the recordable area, the improvement comprising:

the groove in the read-only area forming wobbling tracks having a depth greater than 170 nm and wherein the depth d2 of the depression in the groove in the read-only area is in a range greater than 170 nm and less than 350 nm.

Another advantage of the present invention is that the conformality of the recording layer on the substrate permits a greater depth of the depressions in the groove than has heretofore been possible while still meeting Orange Book specifications.

In accordance with the present invention the groove in the read-only area forming wobbling tracks is selected to have a depth greater than 170 nm and wherein the depth d2 of the depression in the groove in the read-only area is in a range greater than 170 nm and less than 350 nm. This arrangement provides for improved performance which is within the tolerances of commercial specifications (Orange Book). Moreover, the present invention facilitates the compatibility of both the reading and writing on the hybrid disc.

DETAILED DESCRIPTION OF THE INVENTION

Figure 1:
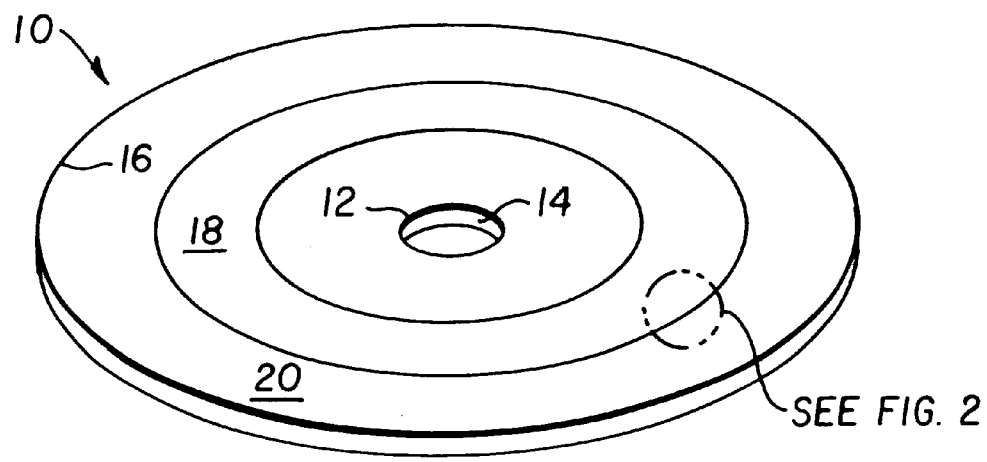
FIG. 1 is a top view of a hybrid optical disc in accordance with the present invention.
Figure 3:
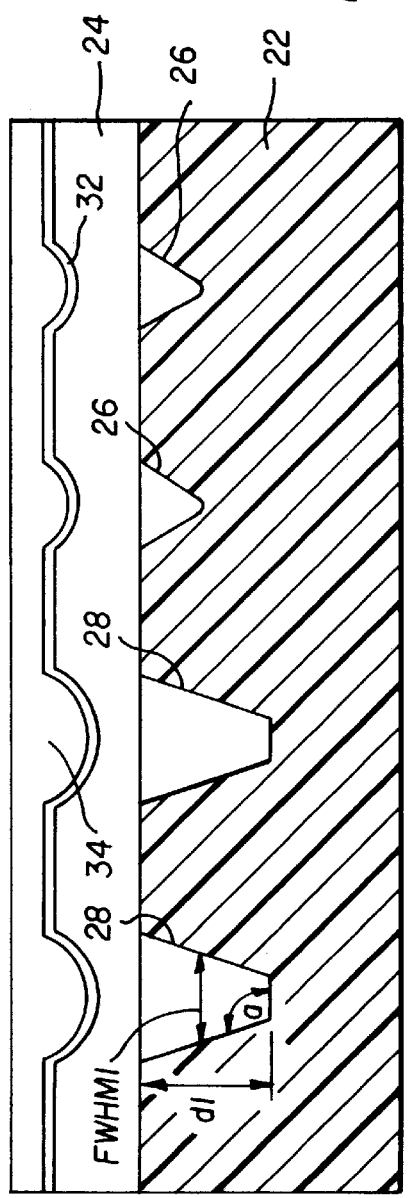
FIGS. 3, 4 and 5 are cross-sectional views respectively taken along the lines 3—3, 4—4 and 5—5.
Figure 4:
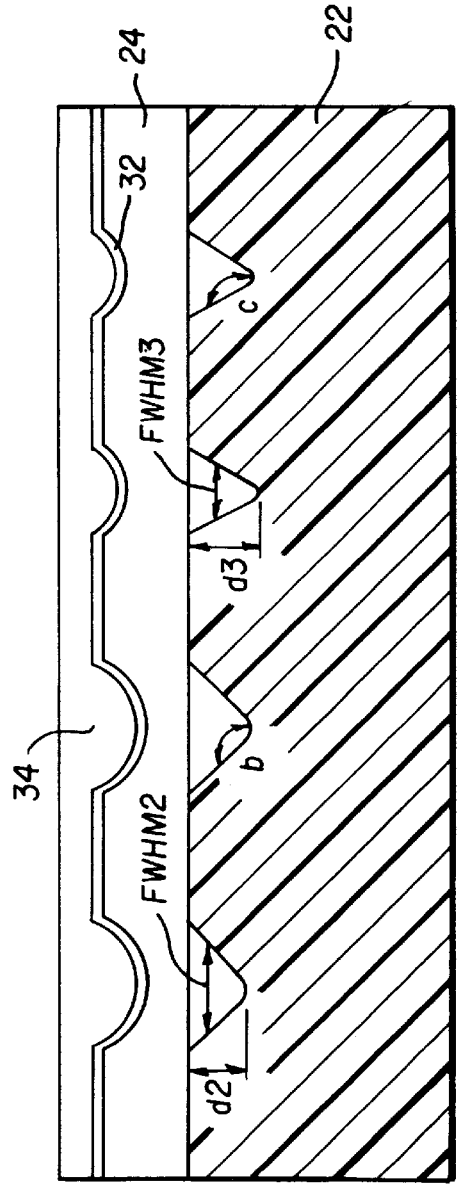
Figure 5:
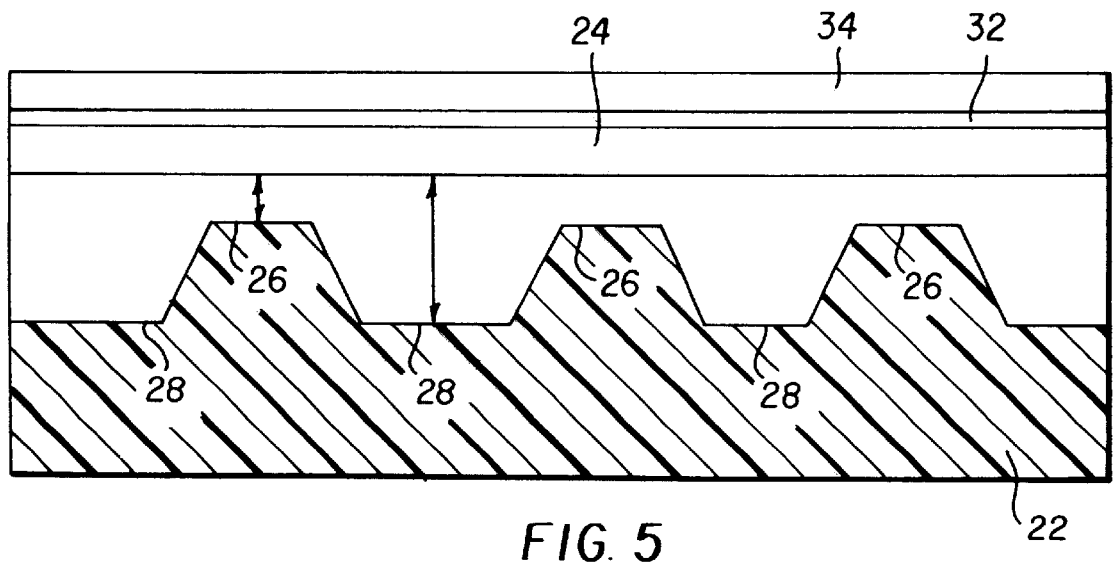

Referring to FIG. 1, a hybrid optical disc 10 is shown in accordance with the present invention. The hybrid optical disc 10 has an inner peripheral edge 12, which defines a central hole 14, and an outer peripheral edge 16. The central hole 14 permits the hybrid optical disc 10 to be mounted in an optical disc transport device which can be used in either a reading or a writing mode. The hybrid optical disc 10 further includes a read-only area 18 and a recordable-area 20. Although it is only necessary to have a single read-only area 18 and a single recordable are 20 in the region near the central hole 14 there are a plurality of interspersed areas 18 and 20. In the region near the outer peripheral edge 16 there is only a recordable area 20. As will be well understood by those skilled in the art a recording layer 24 can contain a dye such as a pthalocyanine dye shown in FIGS. 3–5 is responsive to laser light that change its physical and or optical properties to permit write once recording. However, it will be understood that the recording layer 24 can be formed from a rewritable material such as magneto-optic material or phase change material and the present invention is not limited to write once dyes.

Figure 2:
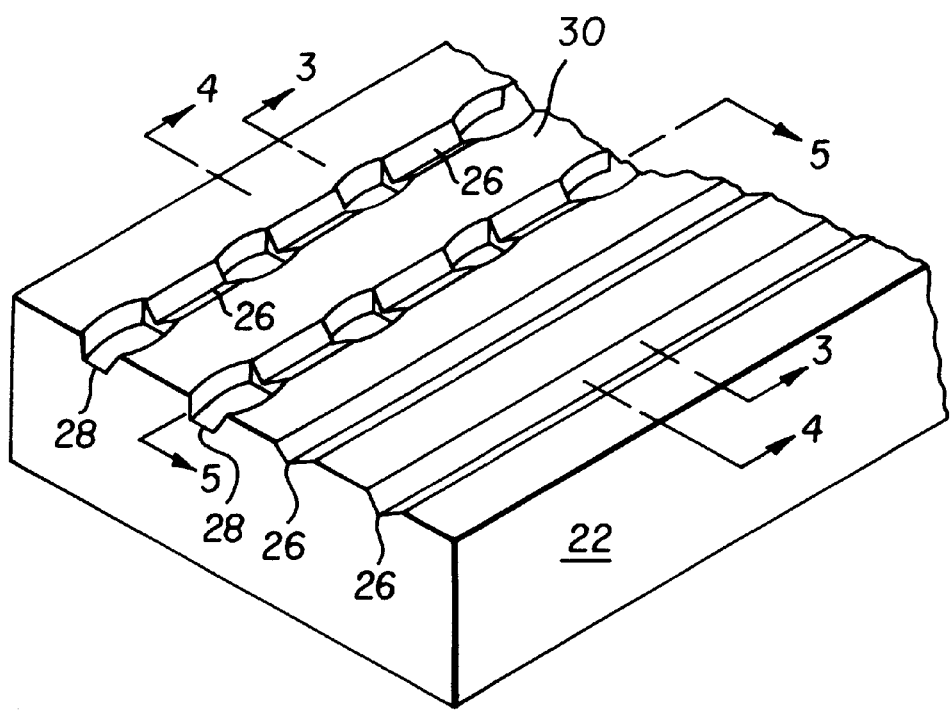
FIG. 2 is an enlarged perspective of a portion of the hybrid optical disk of FIG. 1.

Referring now to FIG. 2, an enlarged perspective of the hybrid optical disc 10 is shown of the read-only area 18 and recordable area 20. In accordance with the present invention, a substrate 22 which can be formed by injection molding includes a wobble groove 26 in both the read-only area 18 and the recordable area 20 which provides tracking information when the hybrid optical disk 10 is either read from or written to. The wobble groove 26 has a substantially V-shaped profile. As shown a depression 28 is formed in the wobble groove 26 in the read-only area 18. A land 30 is provided between each wobble groove 26. The substrate 22 can be formed of an optically transparent polycarbonate as well understood to those skilled in the art. However, the substrate 22 could also be formed from other materials such as glass.

A preferred method of making the substrate 22 is by injection molding. During the injection molding process, the substrate 22 is formed to define the wobble groove 26 and the depressions 28 on the surface of the substrate 22. Over the surface of the substrate 22 is deposited the recording layer 24. In accordance with the present invention, the wobble groove 26 is continuous and extends throughout the read-only area 18 and the recordable area 20. Preferably, the wobble groove 26 is a continuous spiral. In any event the wobble groove 26 and the signals produced by the depressions 28 conform to Orange Book specifications.

Turning now to FIG. 3 which shows the depressions 28 and the wobble groove 26 in the recordable area 20. The depth d2 of the groove 26 is greater than 170 nm and can be in a range of 170 nm to 350 nm. In a preferred range, the depth d2 of the depression in the groove in the read-only area is in a range greater than 290 nm and less than 330 nm. By having this depth d2 it substantially contributes to improved performance during writing and read-out process. In FIG. 3 is shown the depressions 28 which forms a wall angle a which has been found to preferably be in a range of 40–80°. The depressions 28 have a width FWHM1 which is measured at full width half maximum (FWHM). In other words, at one half the height of the depression 28. FWHM1 is in a range of 200 nm to 800 nm.

Turning now to FIG. 4 which shows the wobble groove 26 in the read-only area 18 and recordable area 20. The wobble groove 26 in the recordable area 20 has a depth d3 in a range of 100 to 300 nm. The wobble grooves 26 in the read-only area 18 have a width FWHM2 in a range of 200 to 800 nm. The wobble grooves 26 in the read-only area 18 form a wall angle b in a range of 40–80°. The depth d3 of the wobble groove 26 in recordable area is a range of 100 to 300 nm. The wobble grooves 26 in the recordable area have a width FWHM3 in a range of 200 nm to 800 nm. The wobble grooves 26 in the recordable area form a wall angle c in a range of 40–80°. Turning now to FIG. 5 which shows the wobble groove 26 in the in-track position in the read-only area 18 depicting the relationship of the depressions 28. The depth dimensions are the same as described in FIGS. 3 and 4 for the modulated groove and the groove. The length of each modulated segment of the groove is variable based on the 9 discreet lengths allowable in the Orange Book.

Figure 6:
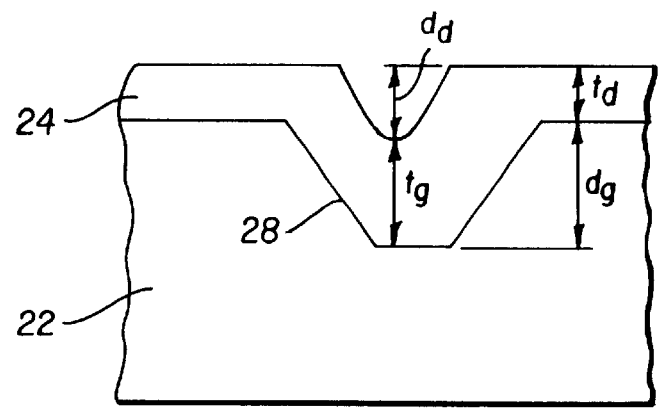
FIG. 6 shows a cross-sectional view of the depression 28 and various dimensions which are needed to achieve desired conformality.

FIG. 6 is view similar to FIG. 3 showing the depressions 28 relative to the recording layer 24 and the substrate 22. Various dimensions and relationships which define the dye conformality are shown. It will be understood that the shown dimensions and relationships for dye conformality are also applicable for wobble groove 26. The following are the various dimensions and relationships which are needed to achieve appropriate dye conformality particularly for forming the wobble groove 26 in the read-only area 18 when they have a depth greater than 170 nm. By following the relationships given below it has been found that important advantages can be achieved. It should be noted that for the depression 28 the term "d1" is the same as dg given below and when the wobble groove 26 is used in the read-only 18 the term "d2" is the same as dg given below and when the wobble groove 26 is used in the recordable area 20 the term "d3" is the same as dg given below.

$t_d$=thickness of dye layer on the land between the grooves
$t_g$=thickness of dye layer in the groove or depression
$d_d$=depth of the conformal depression in the dye layer over the groove
$d_g$=depth of the groove or depression
$n_{pc}$=the real portion of the index of refraction of the substrate
$n_d$=the real portion of the index of refraction of the dye layer
$\lambda$=the wavelength of the readout laser $$OPL \equiv \text{Optical\_Path\_Length} = \sum_i t_i n_i$$

$$\Delta\phi = \text{phase\_difference} = \frac{2\pi}{\lambda}\Delta OPL$$

$$t_g - t_d = d_g - d_d$$

$$\Delta OPL = 2[(d_g n_{pc} + t_d n_d) - t_g n_d]$$

$$\Delta OPL = 2(d_g n_{pc} + t_d n_d - t_d n_d - d_g n_d + d_d n_d)$$

$$\Delta OPL = 2[d_g(n_{pc} - n_d) + d_d n_d]$$

$$\Delta OPL = 2d_g[n_{pc} + n_d(C - 1)]$$

$$\text{where: } C \equiv \text{Conformality} = \frac{d_d}{d_g}$$

$$\Delta\phi = \frac{4\pi}{\lambda}[n_{pc} + n_d(C-1)]d_g$$

$$d_g = \frac{\Delta\phi\lambda}{4\pi[n_{pc} + n_d(C-1)]}$$

It is well known that the signal modulation for a phase contrast signal is maximized when the phase depth of the mark which forms the depth modulated portion of the groove is ¼ wave as compared to the land between the marks. Since the light is reflected and passes through this structure twice, the total phase difference on reflection is ½ wave. Similarly it is known that the maximum push pull tracking error signal occurs when the phase depth is ⅛ wave. Further it has been shown that to meet the criteria for signal modulation required in the Orange Book the marks should have phase depth between than ⅛ waves and ⅜ waves and that the phase depth for push pull tracking signals within the range required by the Orange book requires an average phase depth between ¹⁄₁₆ and ³⁄₁₆ wave (See U.S. Pat. No. 5,316,814.)

The recording layer 24 is preferably a dye layer spin coated onto the substrate 22. For an example of a dye coating arrangement, see commonly-assigned U.S. patent application Ser. No. 08/734,432 entitled "Optical Recording Elements Having Recording Layers Containing Mixtures of No K Metallized Formazan and Cyanine Dyes" by Chapman et al.

During deposition of the recording layer 24, the read-only area 18 and recordable area 20 are covered by such recording layer 24. Thus, prior to deposition of a reflective layer 32, the surface of the substrate 22 is cleaned in a manner well known in the art by depositing a dye compatible solvent onto the surface of the substrate 22 while the hybrid optical disc 10 is rotating. The solvent dissolves and removes the residual portion of the recording layer 24 on the surface of the substrate 22.

In order to improve the conformality of the recording layer 24 on the substrate 22 the solvent should be carefully selected. By selecting the solvent, the conformality of the recording layer 24 can be in a range of 40–70%. For a specific example when using a phthalocyanine in a host material is solvent coated onto the surface of the substrate 22 using a suitable solvent. Examples of such a solvent are alcohols, hydrocarbon halides, cellosolves, and ketones. Examples of such solvents are 2,2,3,3-tetrafluoropropanol, tetrachloroethane, dichorlomethane, methyl cellosolve, ethyl cellosolve, 1-methyoxy-2-propanol,4-hydroxy-4-methyl-2-pentanone. Preferred solvents are alcohol's since they have the least effect on the preferred polycarbonate substrates.

For a specific example, a hybrid disc has been fabricated wherein d1 was 320 nm; d2 was 200 nm; the angle b was 50°; and angle a was 55°. It has been found that the selection of d1 causes significant improvement in optical disc performance. The contrast performance of hybrid disc is often characterized by the ratio of $I_3$/Itop wherein $I_3$ is the reflectance level of the shortest length of the depression 28 and Itop is the highest in-track reflectance signal from the substrate.

The invention has been described in detail with particular reference to a preferred embodiment thereof. However, it will be appreciated that variations and modifications can be effected by a person of ordinary skill in the art without departing from the spirit and scope of the invention.

PARTS LIST

10 hybrid optical disc
12 inner peripheral edge
14 central hole
16 outer peripheral edge
18 read-only area
20 recordable-area
22 substrate
24 recording layer
26 wobble groove
28 depression
30 land
32 reflective layer

What is claimed is:

1. A hybrid optical recording disc having a substrate and a recording layer disposed over the substrate, the substrate having a read-only (ROM) area in which a groove is modulated by depressions in the substrate and a recordable area in which the groove from the read-only area extends into the substrate in the recordable area, the improvement comprising:

the groove in the read-only area forming wobbling tracks having a depth greater than 170 nm and wherein the depth d2 of the depression in the groove in the read-only area is in a range greater than 170 nm and less than 350 nm.

2. The hybrid optical disc according to claim 1 wherein the groove in the recordable area has a different wobble amplitude than the groove in the read-only area.

3. The hybrid optical disc according to claim 1 where in the depth d2 of the depression in the groove in the read-only area is in a range greater than 290 nm and less than 330 nm.

* * * * *